United States Patent
Helm (10) Patent No.: US 12,341,387 B2
(45) Date of Patent: Jun. 24, 2025

(54) METHOD FOR THE PRODUCTION OF A BASE WINDING ASSEMBLY AND A STATOR FOR AN ELECTRICAL MACHINE

(71) Applicant: Additive Drives GmbH, Halsbruecke (DE)

(72) Inventor: Axel Helm, Dresden (DE)

(73) Assignee: Additive Drives GmbH, Halsbruecke (DE)

( * ) Notice: Subject to any disclaimer, the term of this patent is extended or adjusted under 35 U.S.C. 154(b) by 689 days.

(21) Appl. No.: 17/597,727

(22) PCT Filed: Jul. 21, 2020

(86) PCT No.: PCT/EP2020/070509
§ 371 (c)(1),
(2) Date: Jan. 20, 2022

(87) PCT Pub. No.: WO2021/013816
PCT Pub. Date: Jan. 28, 2021

(65) Prior Publication Data
US 2022/0263392 A1    Aug. 18, 2022

(30) Foreign Application Priority Data
Jul. 22, 2019   (DE) .................. 10 2019 119 745.7

(51) Int. Cl.
*H02K 15/0407*   (2025.01)
*B22F 10/28*   (2021.01)
(Continued)

(52) U.S. Cl.
CPC ......... *H02K 15/0407* (2013.01); *B22F 10/28* (2021.01); *B33Y 10/00* (2014.12);
(Continued)

(58) Field of Classification Search
CPC ........ H02K 15/0407; H02K 3/00; H02K 3/04; H02K 3/26; H02K 15/0068; H02K 15/0414; B22F 10/28; B33Y 10/00; B33Y 80/00
See application file for complete search history.

(56) References Cited

U.S. PATENT DOCUMENTS

| 4,346,320 A | 8/1982 | Davey |
| 6,865,796 B1 * | 3/2005 | Oohashi ................... H02K 3/12 242/432 |

(Continued)

FOREIGN PATENT DOCUMENTS

| CH | 108795 | 2/1925 |
| DE | 525006 | 6/1931 |

(Continued)

OTHER PUBLICATIONS

Simpson et.al., Design of High Performance Shaped Profile Windings for Additive Manufacture, 2019 IEEE Energy Conversion Congress and Exposition (ECCE), pp. 761-768 (Year: 2019).*

(Continued)

*Primary Examiner* — Jeffrey T Carley
*Assistant Examiner* — Jose K Abraham
(74) *Attorney, Agent, or Firm* — Polsinelli PC (57) ABSTRACT

A method of manufacturing a base winding assembly of a stator. The base winding assembly includes a plurality of conductor loop groups each formed of a plurality of conductor loops that are open on one side, wherein the closed ends of the conductor loops that are open on one side can be arranged at one face of the base assembly and the open ends can be arranged at the opposite face side of the base assembly, wherein the manufacturing of the base winding assembly is done by an additive manufacturing process in which a layer-by-layer application and local solidification of build-up material takes place. Furthermore, a method for (Continued)

manufacturing a stator for an electric machine, as well as a base winding group of a stator and a stator are proposed.

17 Claims, 5 Drawing Sheets

(51) Int. Cl.
| | | |
|---|---|---|
| *B33Y 10/00* | (2015.01) | |
| *B33Y 80/00* | (2015.01) | |
| *H02K 3/00* | (2006.01) | |
| *H02K 3/04* | (2006.01) | |
| *H02K 3/26* | (2006.01) | |

(52) U.S. Cl.
CPC ............... *B33Y 80/00* (2014.12); *H02K 3/00* (2013.01); *H02K 3/04* (2013.01); *H02K 3/26* (2013.01)

(56) References Cited

U.S. PATENT DOCUMENTS

| | | |
|---|---|---|
| 2001/0010442 A1 | 8/2001 | Yasuhara et al. |
| 2005/0108870 A1 | 5/2005 | Harada et al. |
| 2008/0007133 A1 | 1/2008 | Onimari et al. |
| 2009/0230808 A1* | 9/2009 | Tatebe .................. H02K 3/18 310/201 |
| 2014/0035423 A1* | 2/2014 | Veronesi ............... B33Y 10/00 156/60 |
| 2015/0076951 A1 | 3/2015 | Lynch et al. |
| 2018/0200823 A1* | 7/2018 | Huang .................. H02K 19/16 |
| 2018/0205284 A1* | 7/2018 | Huang .................. H02K 5/1737 |
| 2018/0205285 A1* | 7/2018 | Huang .................. H02K 1/265 |
| 2018/0205299 A1* | 7/2018 | Huang .................... H02K 3/12 |

FOREIGN PATENT DOCUMENTS

| | | |
|---|---|---|
| DE | 102015211552 | 12/2016 |
| EP | 1207613 | 5/2002 |
| EP | 2084807 | 8/2009 |
| JP | 11150899 | 6/1999 |
| JP | 2000152545 | 5/2000 |

OTHER PUBLICATIONS

Written Opinion for Application No. PCT/EP2020/070509, dated Jan. 25, 2022, 9 pages.

PCT Search Report for Application No. PCT/EP2020/070509, dated Oct. 15, 2020, 201 pages.

European Search Report for Application No. 01116703.8, dated Jan. 15, 2004, 2 pages.

* cited by examiner

METHOD FOR THE PRODUCTION OF A BASE WINDING ASSEMBLY AND A STATOR FOR AN ELECTRICAL MACHINE

TECHNICAL FIELD OF THE INVENTION

The invention relates to a method of manufacturing a base winding assembly of a stator for an electrical machine, a method of manufacturing a stator for an electrical machine, as well as a base winding assembly of a stator and a stator.

BACKGROUND OF THE INVENTION

In the manufacture of electrical machines, a large proportion of the manufacturing time and manufacturing cost is spent on the manufacture of the stator. Complex spread windings as well as the development towards more compact structures require increasingly precise windings as well as exact compliance with geometric specifications in order to meet the constantly growing requirements with regard to the efficiency and precise controllability of electrical machines.

To achieve high fill factors, stator windings are wound from insulated conductors. The connecting leads, which form a winding head at the ends of the windings, require a great deal of installation space here, since many individual conductors must be provided for high numbers of turns and the bending radius of the individual conductors must be taken into account to prevent breaking of the connecting leads in the winding head.

In light of this, it has been proposed to manufacture parts of the stator or the entire stator by means of an additive manufacturing process, in which the corresponding parts of the stator are manufactured by layer-by-layer application and locally selective solidification of a build-up material.

For example, US 2015/0076951 A1 describes a manufacturing process for an electrical machine in which the entire stator is manufactured using an additive manufacturing process. This requires the provision of several additive manufacturing devices for the different materials used in the stator and leads to an expensive and complex manufacturing process overall.

DE 10 2015 211 552 A1 proposes a method for manufacturing a winding section of an electrical machine, in which the windings of an electrical machine are manufactured in the form of a plurality of winding sections using a CAD model. The individual winding sections are formed with contacting elements via which the winding sections are mechanically connected to each other. This requires the separate production of several components, which is associated with corresponding time and cost expenditure. In addition, the mechanical connection of the winding sections is prone to errors.

SUMMARY OF THE INVENTION

Against this background, it is the object of the present invention to specify a stator whose winding head requires as little installation space as possible and which can be manufactured efficiently and inexpensively with a high manufacturing accuracy.

This object is solved by a method for manufacturing a base winding assembly of a stator for an electrical machine, a method for manufacturing a stator for an electrical machine, a base winding assembly of a stator and a stator.

In particular, the object is solved by a method of manufacturing a base winding assembly of a stator for an electric machine having a plurality of conductor loop groups each formed of a plurality of conductor loops that are open on one side, wherein the closed ends of the conductor loops that are open on one side can be arranged at one face side of the base assembly and the open ends can be arranged at the opposite face side of the base assembly, wherein the base winding assembly is manufactured by an additive manufacturing process in which a layer-by-layer application and local consolidation of build-up material takes place.

According to a first aspect of the present invention, an additive manufacturing process is used for manufacturing of the base winding assembly, which can be completed with a stator core and a winding head to form a stator, as this allows complex winding geometries to be manufactured with high precision.

According to the invention, the manufacturing of the base winding assembly occurs such that the base winding assembly consists of conductor loops that are open on one side, wherein the closed ends of all conductor loops are arranged on a common side of the base winding assembly, which is intended to form a first face side of a stator base assembly of the base winding assembly and a stator core, which later becomes a face side of the stator. At this end, all conductor loops are closed and form a winding head. It is not necessary to make a winding head for this end of the base winding assembly after the base winding assembly is completed.

The open ends of all the conductor loops are arranged on an opposite side, which is intended to form the second face side of the stator. By this arrangement of the open ends a base winding assembly is created into which a stator core can be easily inserted at a later stage, whereby the base winding assembly can contribute to a more efficient manufacture of a stator.

Since the base winding assembly according to a first aspect of the present invention is manufactured using an additive manufacturing process, even complex winding geometries can be manufactured precisely and quickly.

The additive manufacturing process in the sense of the present invention is generally characterised by producing three-dimensional objects or components layer-by-layer by selectively solidifying a shapeless build-up material. The solidification can be brought about by supplying thermal energy to the build-up material, by irradiating it with electromagnetic radiation or particle radiation, for example in laser sintering ("SLS" or "DMLS"), laser melting or electron beam melting. In laser sintering or laser melting, the area of impact of a laser beam (laser spot) on a layer of the build-up material is moved over those positions of the layer that correspond to the component cross-section in this layer of the component to be manufactured. A thin layer of a powdery build-up material is repeatedly applied and the build-up material in each layer is selectively solidified locally by selective irradiation with at least one radiation source and prior to the next application step the processing plane is changed.

Accordingly, in accordance with a first aspect of the present invention, the base winding assembly is manufactured by applying a shapeless build-up material to form the base winding assembly layer-by-layer according to the object geometry to be manufactured, solidifying the applied build-up material by application of radiation energy, and changing the processing plane prior to the next application step so that the previously solidified layer serves as a base for the next layer of the shapeless build-up material.

Additive manufacturing of the base winding assembly preferably starts with the closed ends of the open conductor loops. These are then built up layer-by-layer until the open ends are reached.

By the described method for manufacturing the base winding assembly, a one-piece manufacturing of the base winding assembly can be realised, which has numerous advantages. Due to the one-piece manufacturing, no transition resistances can occur, as they do in the case of plug connections of base winding assemblies that are plugged together. Furthermore, the manufacturing process is simplified and less prone to errors, as there is no risk of connection interruptions, as can occur with plug connections. In addition, additive manufacturing makes it possible to reduce the distances between the individual windings, as no space needs to be provided for plug connections.

As build-up material for the base winding assembly a material that is electrically conductive after solidification is employed. The preferably powdery build-up material preferably comprises at least one metal. Preferably, the build-up material consists of at least 10% by weight, further preferably 50% by weight, still further preferably at least 80% by weight, still further preferably at least 99% by weight, still further preferably at least 99.99% by weight of one or more conductive metal(s).

In an advantageous further development of the invention, during the manufacture of the base winding group, connecting structures are formed on the open ends of the conductor loops that are open on one side, which rigidly connect the conductor loops within a conductor loop group and/or the conductor loop groups to each other. This increases the mechanical stability of the base winding assembly, which contributes to a further improved manufacturing accuracy of the stator as a whole, since, on the one hand, a high positional accuracy of the conductor loops with respect to each other can be achieved and maintained during the manufacturing process, and, on the other hand, a displacement of the conductor loops that are open on one side during the manufacturing process can be prevented, in particular in the case of a later insertion of a stator core into the base winding assembly, which may already be separated from the building plate at this time.

In a preferred embodiment, the connecting structures are formed in such a way that they do not protrude beyond the surfaces formed by the open ends of the conductor loops at the face side of the stator, so that the connecting structures do not obstruct the insertion of a stator core. Preferably, the connecting structures are formed with the base winding assembly using the additive manufacturing process.

In an alternative preferred embodiment, the connecting structures are formed such that they include spacers which are formed to provide a guide for the sliding on of a stator core. This contributes to a further improvement in the efficiency with the manufacturing of a stator with the base winding assembly according to the invention, as errors when inserting a stator core into the base winding assembly can be prevented. The spacers are preferably formed by elements of the connecting structures which protrude beyond the surfaces formed by the open ends of the conductor loops at the face side of the stator, so that a predetermined distance between the conductor loop groups and a stator core to be inserted can be maintained by the spacers.

In an advantageous further development of the invention, the conductor loops that are open on one side have features for fixing an insulator plate and/or for guiding a stator core. For example, for fixing an insulator plate that is attachable to the open ends of the conductor loops of the base winding assembly, projections can be formed on the inner sides of the closed ends of the open conductor loops that are engageable with corresponding recesses of the insulator plate when the insulator plate is attached to the open ends of the base winding assembly.

For guiding a stator core, projections may be formed on at least one of the conductor loops in addition to or as an alternative to the spacers formed on the open ends of the conductor loops. Such protrusions serve as features for guiding a stator core when a stator core is inserted into the open ends of the conductor loop groups, as the protrusions keep the stator core at a distance from the conductor loops. In this case, the protrusions may be provided with predetermined breaking points so that they can be easily removed at a later time. The projections may be arranged on the conductor loops on the side facing the inner side of the conductor loop to ensure a distance between the pole cores of the stator and the inner side of the conductor loops, or on an outer side of the base winding assembly to fix the outer circumference of the stator core.

The features for fixing the insulator plate and/or for guiding a stator core can be manufactured with the other elements of the base winding assembly during the additive manufacturing process. As a result, the manufacturing accuracy and manufacturing speed of the stator can be improved in a simple manner without significant additional effort, since the need for an additional fixture during the assembly of the base assembly and the stator core is dispensed with.

In an advantageous further embodiment of the invention, the manufacturing of the base winding assembly occurs such that the conductor loops that are open on one side have a textured, rough surface. Preferably, the surfaces of the conductor loops that are open on one side have a mean roughness index Ra (preferably determined according to ISO 1302:2002) of 5 μm or more. The surface roughness can be deliberately created during additive manufacturing or increased by appropriate post-processing to improve the adhesive properties of the open conductor loops for an insulating medium, for example a resin, with which the interstices between the open conductor loops can be filled.

It is further preferred that the base winding assembly is manufactured on a build plate such that the closed ends of the conductor loops that are open on one side are disposed on the build plate. This improves the mechanical stability of the base winding assembly during manufacture and a defined distance between the windings with respect to each other is ensured.

The above object is solved according to a second aspect of the invention, by a method of manufacturing a stator for an electrical machine, comprising the following steps:

Manufacturing a stator base assembly by assembling a base winding assembly and a stator core having a plurality of pole cores,
wherein the base winding assembly comprises a plurality of conductor loop groups each formed of a plurality of conductor loops that are open on one side, wherein the closed ends of the conductor loops that are open on one side are arranged at one face side of the base winding assembly and the open ends are arranged at the opposite face side of the base winding assembly,
wherein the joining of the base winding assembly and the stator core occurs such that at least one pole core is disposed in each conductor loop group; and
forming a winding head on the face side of the stator base assembly with the open ends of the conductor loops that are open on one side.

According to the above method, the stator is manufactured in a two-step process. First, a stator base assembly is manufactured by assembling a base winding assembly and a stator core having a plurality of pole cores. Hereby, the base winding assembly is formed by a plurality of conductor loops that are open on one side, wherein the closed ends of the conductor loops that are open on one side are arranged at one face side of the base winding assembly and the open ends are arranged at the other face side of the base winding assembly. The assembly of the base winding assembly with the stator occurs such that the pole cores of the stator core are arranged in the conductor loops that are open on one side.

The stator base assembly thus formed can then be completed into a stator by forming a winding head on the face side of the stator base assembly with the conductor loops that are open on one side, which connects the conductor loops that are open on one side into windings of the stator.

As mentioned already in connection with the base winding assembly described above, according to a first aspect of the present invention, an additive manufacturing process is used to manufacture the base winding assembly, as this allows also complex winding geometries to be manufactured with high precision. When, in the method of manufacturing a stator, the base winding assembly is manufactured according to the first aspect of the invention using an additive manufacturing process, the base winding assembly is manufactured such that the closed ends of the conductor loops that are open on one side are arranged on a side of the base winding assembly that forms a first face side of the stator after completion of the manufacturing process. At this first face side of the stator, all conductor loops of the base winding assembly are already closed, so that the windings at this face side do not have to be closed in a later operation step. Further, the manufacturing of the base winding assembly occurs such that the open ends of the conductor loops that are open on one side are arranged on a side of the stator that forms the second face side of the stator after completion of the manufacturing process.

With this configuration of the base winding assembly, it is possible to assemble the base winding assembly and the stator core into the stator base assembly in a second manufacturing step by inserting the stator core into the base winding assembly through the open ends of the conductor loops (groups). Insertion can be accomplished by simply inserting the pole cores of the stator core into the open ends of the conductor loops that are open on one side. The insertion of the stator core is thus extremely simple and quick to perform. The arrangement of the pole cores on the stator core corresponds to the arrangement of the gaps between the open ends of the conductor loops in the base winding assembly, so that there can be no misalignment of the base winding assembly with respect to the stator core when the stator core is plugged onto the base winding assembly.

The manufacturing of the geometrically and structurally less complex stator core can be done independently of this to improve the efficiency of the manufacturing process.

However, it is also possible to use conventionally manufactured conductor loops that are open on one side to reduce the manufacturing costs of the stator base assembly, for example, by manufacturing the conductor loops that are open on one side by means of a stamping-bending process and placing them on a stator core with a plurality of pole cores such that the conductor loops are inserted into the grooves present between the pole cores of the stator core. The only decisive factor is that the stator base assembly is formed such that the open ends of the conductor loops of the base winding assembly are arranged such that, after assembling of the base winding assembly and the stator core the winding head can be formed on the open ends of the conductor loops of the base winding assembly.

In the context of the present invention, inserting the stator core into the open conductor loops of the base winding assembly is to be understood as either inserting the stator core into the open ends of the conductor loops of the conductor loop groups, or inserting the conductor loops into the grooves present between the pole cores of the stator core. It is only essential that after the insertion step the pole cores are arranged in the conductor loops. This can also be achieved by not assembling the conductor loops in advance to form a base winding assembly, but rather by placing the conductor loops directly onto the pole cores of the stator core and thus forming the base winding assembly while placing the conductor loops onto the stator core. For the manufacturing method according to the invention, it is only decisive that after the assembly a stator base assembly is obtained in which the open ends of the conductor loops that are open on one side are arranged on one face side of the stator base assembly so that the winding head of the stator can be formed on this face side.

It is possible that some of the conductor loops that are open on one side are formed so that they extend over several adjacent conductor loop groups. This makes it possible to produce a distributed winding in which some of the conductor loops that are open on one side enclose more than one pole. It is only decisive that the open ends of the conductor loops that are open on one side in the base winding assembly are arranged such that an insertion of components into the base winding assembly via the open ends of the conductor loops that are open on one side is possible.

It is preferred that the winding head is manufactured via an additive manufacturing process that allows precise manufacturing of the winding head. In this case, the winding head is manufactured in that a shapeless build-up material for forming the winding head is applied to the open ends of the conductor loops of the base winding assembly layer-by-layer according to the object geometry of the winding head to be manufactured, the applied build-up material is selectively solidified by applying radiation energy, and prior to the next application step the processing plane is changed so that the previously solidified layer serves as a base for the next layer of the shapeless build-up material. Preferably, the winding head is built on a conductive material on an insulating substrate, as will be further explained in detail below.

As build-up material for the winding head again a build-up material is employed which is electrically conductive after solidification. The preferably powdery build-up material preferably comprises at least one metal. Preferably, the build-up material consists of at least 10% by weight, further preferably 50% by weight, still further preferably at least 80% by weight, still further preferably at least 99% by weight, still further preferably at least 99.99% by weight, of one or more conductive metal(s).

Overall, with the manufacturing process of a stator according to the invention an efficient and cost-effective possibility for manufacturing a stator with a small installation space and a high manufacturing precision is provided by enabling a hybrid manufacturing process of additive manufacturing processes and conventional mechanical manufacturing steps. The additive manufacturing process can be used specifically for the manufacture of components of the winding structure that are geometrically complex and sensitive with regard to manufacturing tolerances. The manufacturing of the winding structure is done in two parts: First, the base winding assembly with the open conductor loops is manufactured, which enables the insertion of the stator core by means of a simple insertion into the open ends of the conductor loops. Subsequently, the additive manufacturing process can be used to form the structurally complex winding head.

With the method according to the invention, the respective advantages of the additive manufacturing process and conventional mechanical manufacturing steps are exploited to produce a stator with high manufacturing accuracy quickly and inexpensively, which has a winding head with comparatively small installation space.

As already explained above, according to the method of manufacturing a stator according to the invention, the manufacturing of the base winding assembly can be carried out either by means of an additive manufacturing process or by means of a conventional process such as a stamping-bending process, depending on the requirement for the accuracy of the base winding assembly. In an advantageous further embodiment of the invention, the stator core has a yoke via which the pole cores are connected, whereby the stator core is inserted with the pole cores into the open ends of the conductor loops that are open on one side. With this embodiment of the stator core, a structurally simple and robust solution for the stator core is created, which enables simple and non-error prone insertion of the stator core into the conductor loops that are open on one side.

In a further advantageous further development of the invention, the stator core is formed in one-piece and/or is produced by an additive manufacturing process. This enables precise manufacturing of the stator core. The one-piece design of the stator core contributes to a simplification of the manufacturing process, because the insertion of the pole cores into the conductor loops that are open on one side is carried out in a single step. In addition, with a one-piece stator core, a mechanically particularly robust stator is obtained.

It is also preferred that the stator core is made of a soft magnetic material, in particular of FeSi, $FeSO_4$ or amorphous iron materials. This leads to a reduction in power losses when the stator is energised. If the stator core is manufactured by means of an additive manufacturing process, soft magnetic powder composite materials are preferably used to manufacture the stator core.

It is further preferred that the connecting structures are removed prior to forming the winding head. By this it can be ensured that the connecting structures do not cause undesirable short circuits between the conductor loops of the base winding assembly. If the connecting structures include spacers that provide a guide for the insertion of the stator core into the open conductor loops by sliding onto the base winding assembly through the open ends of the conductor loop groups, these are removed with the connecting structures. The removal of the connecting structures may be done, for example, by a mechanical process such as milling.

In an advantageous further embodiment of the invention, prior to inserting the stator core, an electrically insulating layer for preventing an electrical contact between the conductor loop groups and the stator core is applied to the inner side of the closed ends of the conductor loops that are open on one side. This prevents an electrical contact between the conductor loops and the stator, which can lead to short circuits of the windings of the stator. The insulating layer may be formed as solid material or as coating.

In an advantageous further embodiment of the invention, the electrically insulating layer is formed by an insulator plate which is placed on the open ends of the conductor loops that are open on one side, so that the inner sides of the closed ends of the conductor loops that are open on one side are covered by the insulator plate. This is a constructively simple measure to ensure insulation between the stator core and the inside of the closed ends of the conductor loops.

The insulator plate is preferably made from a temperature-resistant insulating material such as polyether etherketone (PEEK), a material with high thermal conductivity such as aluminium oxide ($Al_2O_3$), or a suitable plastic with high thermal stability. In addition to its insulating function, the insulator plate can serve as a spacer between the stator core and the conductor loops.

The thickness of the insulator plate can be selected such that a desired distance between the stator core and the conductor loops can be set. Preferably, the insulator plate is in one piece and has recesses for the open ends of the conductor loops, which are dimensioned and arranged so that the insulator plate can be placed on the open ends of the conductor loops and guided up to the inside of the closed ends of the conductor loops.

The insulator plate can have projections on the side which, in the plugged on state of the insulator plate, faces the inner sides of the closed ends of the conductor loops, which are arranged such that they engage in the gaps between the open conductor loops when the insulator plate is plugged on. Thereby positioning of the insulator plate when plugging it on can be facilitated. Alternatively, projections may be provided on the inside of the closed ends of the conductor loops that are open on one side, which engage in recesses formed on the insulator plate when the insulator plate is plugged onto the base winding assembly.

In an alternative advantageous further embodiment of the invention, the electrically insulating layer is formed by a coating material that is applied to the inner side of the closed ends of the conductor loops. The coating material can be made of a temperature-resistant insulating varnish which sprayed or applied to the inner side of the closed ends of the conductor loops that are open on one side.

In an advantageous further embodiment of the invention, when the stator core is inserted, an insulating material, preferably insulating paper, is inserted between the stator core and the conductor loops that are open on one side. This further improves the electrical insulation between the stator core and the base winding assembly. The insulating material may be provided on the portions of the conductor loops that are open on one side which extend between the face sides of the stator, particularly if the inner sides of the closed ends of the conductor loops are insulated from the stator core by means of the electrically insulating layer described above, to ensure complete insulation between the base winding assembly and the stator core.

In an advantageous further embodiment of the invention, after insertion of the stator core, the remaining gaps between the base winding assembly and the stator core are filled with an insulating medium, preferably an epoxy resin. This provides an electrical insulation between the conductor loops on the one hand, and mechanically fixes the conductor loops in the stator on the other hand.

According to a third aspect of the invention, prior to forming the winding head, a printable substrate is placed on the face side of the stator base assembly with the open ends of the conductor loops that are open on one side, which includes conductive structures for connecting the conductor loops that are open on one side. This allows a safe and reproducible connection of the conductor loops that are open on one side to stator windings and reduces the risk of unwanted short circuits between the stator windings, as the conducting structures for closing the open conductor loops on the printable substrate are electrically insulated from each other and from the stator core.

The advantages of placing the printable substrate arise in particular upon a manufacturing of the winding head by means of an additive manufacturing process. The conductive structures on the substrate form a starting layer for the additive manufacturing process of the winding head, on which the additive manufacturing process for forming connecting leads begins, with which the open conductor loops are connected. Thus, the insulating part of the printable substrate does not have to fulfil any special requirements with regard to the additive manufacturing of the winding head. The connecting leads are manufactured essentially perpendicular to the plane of the substrate and built up layer-by-layer. The connecting leads form an electrically conductive connection between the open ends of the conductor loops and the conductive structures on the printable substrate, whereby only a small gap between the open conductor ends and the conductive structure on the substrate must be bridged.

It is preferred here that the connecting leads of the winding head are formed without crossing, in that after the formation of the first layer of the winding head, the connecting leads are built up in a direction substantially perpendicular to the plane of the substrate on the first layer.

Initially, a gap exists between the open ends of the conductor loops and the conductive structures on the substrate, which is closed by the first layer applied by means of the additive manufacturing process, so that a physical connection is formed between the open ends of the conductor loops and the conductive structures on the substrate. Thereafter, the winding head is built up until a required height of the stator is reached by further building up the winding head on the first layer applied by the additive manufacturing process. By building up the connection leads of the winding head to a certain height beyond the first layer, the conductivity of the connection leads is increased, so that the efficiency of the electrical machine in which the stator manufactured according to the invention is used can be substantially increased.

By building up the connecting leads of the winding head in the height direction, an increase in the cross-section of the connecting leads of the winding head is achieved, with which a possibly poorer conductivity of the material of the connecting leads of the winding head compared to the material of the base winding assembly can be compensated. For this purpose, the overall building height of the connecting leads is increased accordingly in a direction substantially perpendicular to the plane of the substrate, as required.

In particular, the object according to the invention can also be solved if the method described above is employed to form the winding head by means of an additive manufacturing process using the printable substrate with a stator base assembly whose conductor loops have been produced by means of a conventional process such as a stamping-bending process.

Overall, in accordance with the third aspect of the invention, there is provided a method of manufacturing a stator comprising the steps of:

Providing a stator base assembly with a base winding assembly and a stator core, said base winding assembly comprising a plurality of conductor loop groups each formed of a plurality of conductor loops that are open on one side, wherein the closed ends of the conductor loops that are open on one side are arranged at one face side of the base winding assembly and the open ends are arranged at the opposite face side of the base winding assembly, and wherein the stator core is disposed in the base winding assembly such that at least one pole core is disposed in each conductor loop group;

placing a printable substrate on the face side of the stator base assembly with the open ends of the conductor loops;

forming a winding head on the open ends of the conductor loops that are open on one side and the printable substrate by means of an additive manufacturing process.

The advantageous further embodiments described above concerning the printable substrate and the formation of the winding head are applicable in connection with the described method.

In an advantageous further embodiment, the printable substrate is formed of a non-conductive substrate, preferably alumina ($Al_2O_3$) or Direct Copper Bonding (DCB) ceramics, wherein the conductive structures are formed of an electrically conductive material, preferably copper, arranged such that they are connectable to the open ends after placing of the printable substrate for connecting or closing the open conductor loops. Preferably, the printable substrate is made of patterned Direct Copper Bonding (DCB) ceramics. DCB ceramics can be manufactured with a high manufacturing accuracy and allow a reliable and reproducible contacting of the open ends of the conductor loops.

It is further preferred that the printable substrate has recesses that correspond in size and position to the open ends of the conductor loops of the base winding assembly. The printable substrate is then placed on the face side of the stator base assembly with the open ends of the conductor loops such that the open ends of the conductor loops protrude through the recesses of the printable substrate and the printable substrate rests on the stator core.

The thickness of the printable substrate and the conductive structures formed thereon is preferably selected such that the conductive structures and the open ends of the conductor loops that are open on one side, terminate at the same height after the printable substrate has been placed. This allows a simple connection of the open ends of the conductor loops with the conductive structures on the printable substrate, in particular by means of an additive manufacturing process. On the thus formed structure with connected conductive loops, the connecting lines of the winding head can be built up.

The manufacturing of the conductive structures on the insulating substrate can be done by printing, or by means of a laser melting process (Direct Metal Laser Sintering, DMLS) by printing a substrate of aluminium oxide ($Al_2O_3$) with a metal at process temperatures between 400° C. and 800° C. Alternatively, thermal spraying, for example plasma or cold gas spraying, can be used with a mask, or DCB substrates can be patterned by etching or lasering.

In an advantageous further embodiment of the invention, the formation of the winding head and/or the formation of electrical connections for the conductor loop groups is carried out by means of an additive manufacturing process. This simplifies the manufacturing process, since no separate process step needs to be provided for forming the electrical connections.

Said object is further solved in particular by a base winding assembly of a stator for an electric machine, manufactured according to the method described above.

Said object is further solved in particular by a stator for an electric machine, manufactured according to the method described above.

The base winding assembly according to the invention and the stator according to the invention have similar advantages as already described in connection with the methods according to the invention of manufacturing the base winding assembly and the stator. In particular, some or all of the previously described structural features provided by the described manufacturing processes are transferable to the manufactured base winding assembly and the manufactured stator. In particular, the base winding assembly and stator thus provided are characterised by high manufacturing accuracy, low cost and ease of manufacture as well as a space saving design of the winding head.

BRIEF DESCRIPTION OF THE DRAWINGS

Examples of embodiments of the invention are explained in the following with reference to the drawings. They show.

DETAILED DESCRIPTION OF THE EMBODIMENTS

Figure 1:
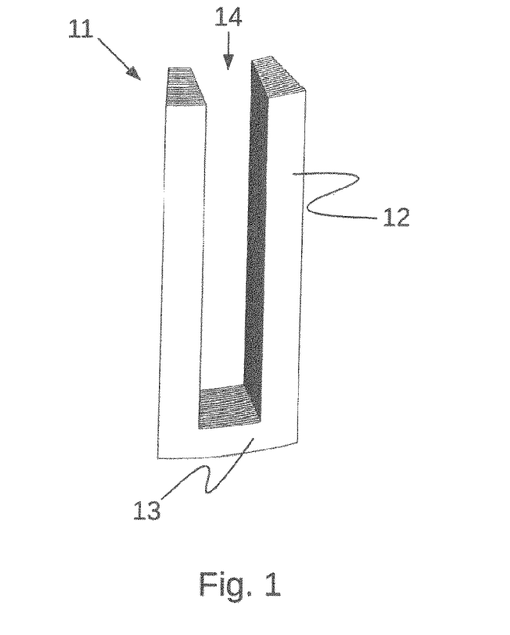
FIG. 1 a schematic perspective view of a conductor loop group.

FIG. 1 shows a schematic representation of a conductor loop group 11 formed as part of a base winding assembly 10 in a manufacturing method according to the present invention. The conductor loop group 11 has a plurality of conductor loops that are open on one side 12. The conductor loops 12 that are open on one side each have a closed end 13 and an open end 14. The conductor loops that are open on one side 12 are arranged in the conductor loop group 11 such that the open ends 14 of the conductor loops that are open on one side 12 form a common opening of the conductor loop group 11. Between each of the conductor loops that are open on one side 12, a predetermined distance is provided.

Figure 2:
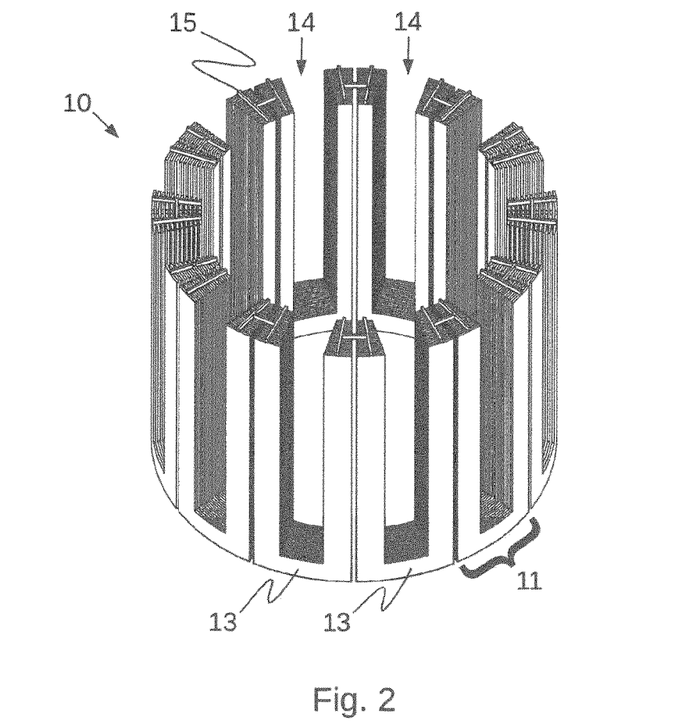
FIG. 2 a schematic perspective view of a basic winding assembly made up of conductor loop groups according to FIG. 1.

FIG. 2 shows a schematic view of a base winding assembly 10 constructed from a plurality of the conductor loop groups 11 shown in FIG. 1. The base winding assembly 10 of FIG. 2 is designed as a component for the manufacture of a stator of a rotating electrical machine. The conductor loop groups 11 are arranged along a cylindrical surface shell. The closed ends 13 of all conductor loops that are open on one side 12 are arranged on a side of the base winding assembly 10 that corresponds to a face side of the finished stator. The open ends 14 of all conductor loops that are open on one side 12 are arranged on the opposite side of the base winding assembly 10.

The base winding assembly 10 shown in FIG. 2 is preferably manufactured by an additive manufacturing process wherein the conductor loop groups 11 are built up layer-by-layer starting from the closed ends 13 upwards towards the open ends 14.

The manufacturing of the conductor loop assemblies 11 is done on a building plate (not shown) to which the first layer of the base winding assembly 10 to be manufactured is applied and solidified.

The building plate is movable along the (vertical) build-up direction of the base winding assembly 10 in order to be able to change the relative position between a coating unit and the building plate by a vertical movement after the build-up material has been applied and solidified in a layer, so that a new building plane is set.

Connecting structures 15 are formed on the open ends 14 of the conductor loop groups 11, which are H-shaped in the embodiment example shown in FIG. 2. The two parallel struts of each connecting structure 15 connect the conductor loops that are open on one side 12 within a conductor loop group 11 to each other, the cross strut between the two parallel struts of each connecting structure establishes a mechanical connection between adjacent conductor loop groups 11.

Overall, the formation of the connecting structures 15 thus mechanically stabilises the entire base winding assembly 10 at the open ends of the conductor loop groups 11.

This enables stable further processing of the base winding assembly 10 with defined distance between the conductor loops to each other in the next processing steps.

As can be seen in FIG. 2, the connecting structures 15 do not protrude beyond the surfaces on the upper side of the base winding assembly 10 spanned by the open ends 14 of the conductor loops that are open on one side 12. This facilitates the insertion of a stator core into the openings of the base winding assembly 10, described further below.

In the present embodiment example, the connecting structures 15 are H-shaped. The connecting structures 15 may also have another shape that is suitable for ensuring the mechanical stabilisation of the conductor loops that are open on one side 12 in the base winding assembly 10.

The connecting structures 15 may also be formed such that they partially protrude above the surfaces spanned by the open ends 14 of the conductor loops that are open on one side 12. For example, the connecting structures 15 shown in the exemplary embodiment of FIG. 2, could be manufactured such that the parallel struts of the H-shaped connecting structure 15 and/or the cross strut extend beyond the edges of the surfaces spanned by the open ends 14 of the conductor loops that are open on one side 12 by a predetermined distance. Thus, the connecting structures 15 can simultaneously serve as spacers or guide elements for a stator core that is inserted into the base winding assembly 10 via the open ends 14 of the conductor loop groups 11.

It should be noted that the configuration of the conductor loop groups 11 in the base winding assembly 10 is not limited to the configuration shown in FIG. 2. It is also possible that some of the conductor loops 12 that are open on one side are configured such that they extend over several adjacent conductor loop groups 11. This makes it possible to produce a distributed winding in which some of the conductor loops 12 that are open on one side include more than one pole. It is only essential that the open ends 14 of the open conductor loops that are open on one side 12 are arranged in the base winding assembly 10 such that an insertion of components into the base winding assembly 10 via the open ends 14 of the conductor loops that are open on one side 12 is possible.

In another embodiment, not shown, projections are formed on at least one of the conductor loops that are open on one side 12 on one or more of the inner edges or the outer side of the conductor loops that are open on one side 12, which can serve as additional guide for a stator core to be inserted. These projections are manufactured so that they can be removed after the stator core has been inserted.

Figure 3:
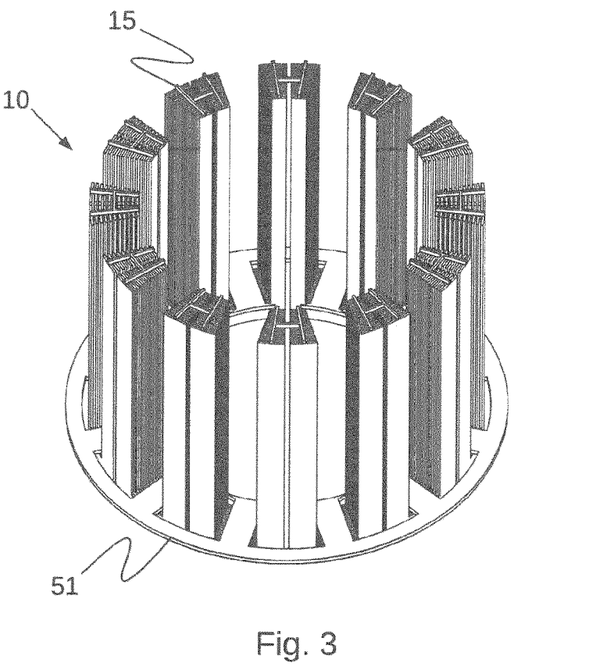
FIG. 3 the base winding assembly of FIG. 2 with an insulator plate attached.

After manufacturing of the base winding assembly 10, the inner surfaces of the closed ends 13 of the conductor loops that are open on one side 12 may be electrically insulated by applying an electrically insulating layer to the inner surfaces of the closed ends 13. FIG. 3 shows the base winding assembly 10 of FIG. 2 with an insulator plate 51. The insulator plate 51 has recesses which correspond in size and position to the areas spanned by the open ends 14 of the conductor loops that are open on one side 12. Thereby the insulator plate 51 can be fitted onto the open ends 14 of the conductor loop groups 11, as shown in FIG. 3.

Figure 4:
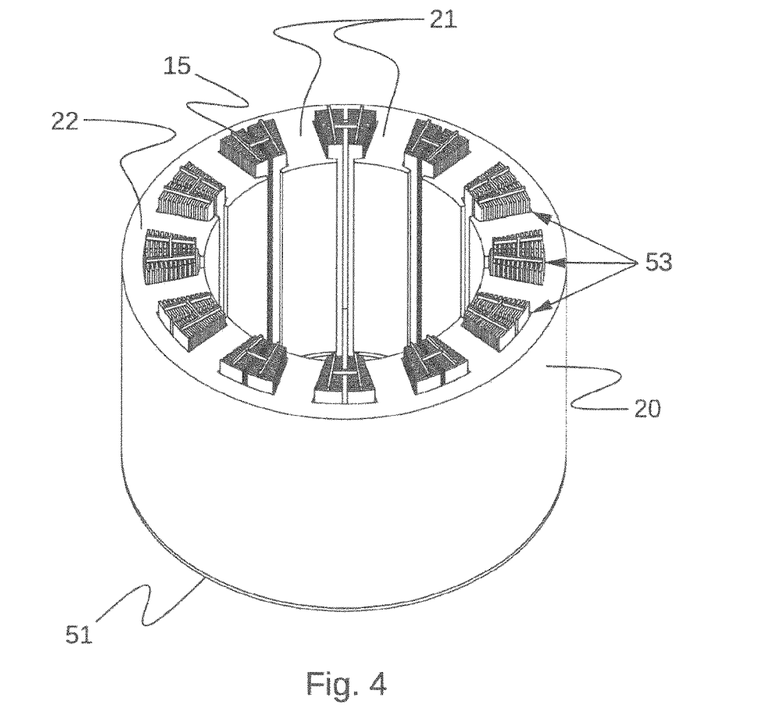
FIG. 4 a stator base assembly comprising the base winding assembly of FIG. 3 with an inserted stator core.

As next step in stator manufacture, the base winding assembly is assembled with a stator core to form a stator base assembly by inserting a stator core with a plurality of pole cores into the conductor loops that are open on one side 12 of the conductor loop groups 11. FIG. 4 shows the base winding assembly 10 of FIG. 3 into which a stator core 20 has been inserted. The stator core 20 is made in one piece and has a plurality of pole cores 21, the number of which corresponds to the number of openings formed by the open ends of the conductor loops that are open on one side 12 at the upper side of the base winding assembly 10. The pole cores 21 are connected to each other by a cylindrical yoke 22.

The stator core 20 is inserted into the conductor loops that are open on one side 12 of the conductor loop groups 11 by inserting it with the pole cores 21 into the open ends 14 of the conductor loops that are open on one side 12. The insulator plate 51 previously fitted to the base winding assembly 10 ensures an electrical insulation between the inside of the closed ends 13 of the conductor loop groups 11 and the stator core 20. An insulating material (not shown) such as insulating paper is inserted between the portions of the conductor loop groups 11 extending vertically in the figures and the pole cores 21 to a provide complete electrical insulation between the stator core 20 and the base winding assembly 10.

Spaces are left between the stator core 20 and the conductor loops that are open on one side 12 of the base winding assembly 10 which are filled with an insulating medium, as indicated by the reference sign 53 in FIG. 4. The insulating medium 53 is preferably formed by an insulating resin so that the spaces can be filled with the insulating medium 53. In this way, the conductor loops 12 that which are open on one side are on the one hand electrically insulated from one another, and on the other hand mechanically fixed in the arrangement comprising the base winding assembly 10 and the inserted stator core 20.

After the stator base assembly consisting of the base winding assembly 10 and the stator core 20 has been filled, the connecting structures 15 are removed so that the open ends 14 of the conductor loops that are open on one side 12 are exposed on the upper side of the base winding assembly 10. The conductor loops that are open on one side 12 can now be completed or connected at the open ends 14 to form windings by forming a winding head on the open ends 14.

Figure 5:
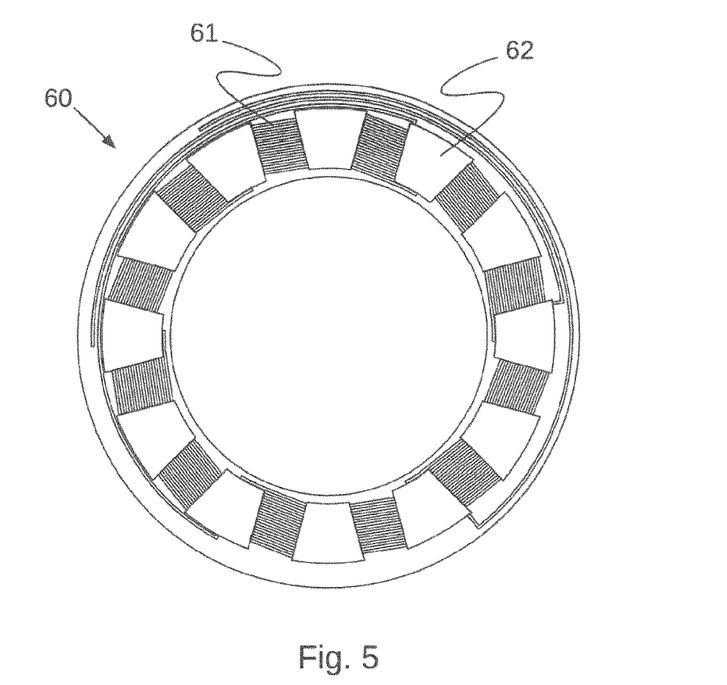
FIG. 5 a top view of a printable substrate for placement on the face side of the stator base assembly with the open ends of the conductor loops that are open on one side of the base winding assembly.

In order to facilitate the manufacture of the winding head and to improve the manufacturing accuracy when connecting the conductor loops, in a preferred embodiment of the invention a printable substrate is placed on the face side of the stator base assembly with the open ends 14 of the conductor loops that are open on one side 12. FIG. 5 shows a possible configuration of a printable substrate 60 in top view. The printable substrate 60 is made of an electrically insulating material, preferably $Al_2O_3$, and has conductive structures 61 that correspond to the geometry of the winding head yet to be manufactured. The printable substrate 60 may be formed of structured DCB ceramics. The printable substrate 60 further has recesses 62 corresponding in size and position to the areas spanned by the open ends 14 of the conductor loops that are open on one side 12.

Figure 6:
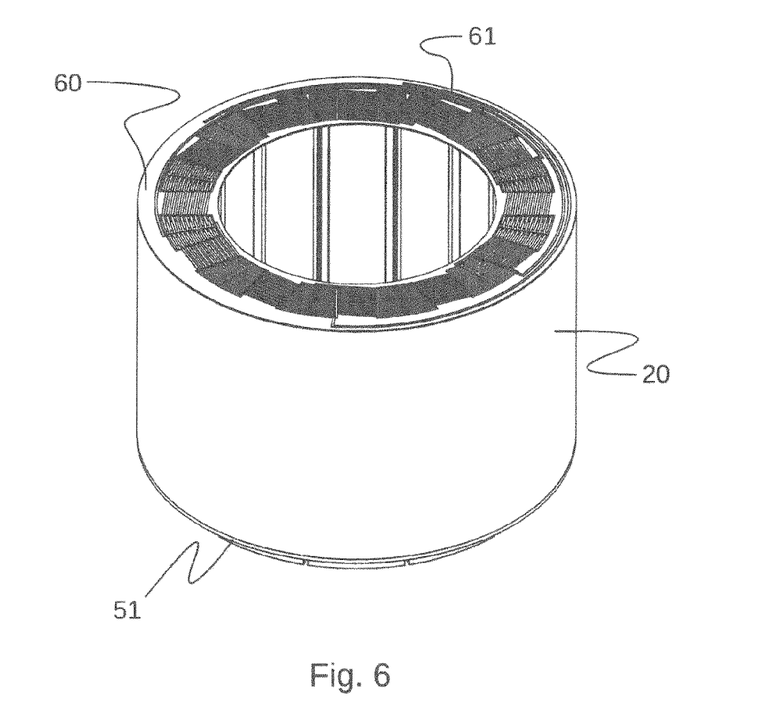
FIG. 6 the stator base assembly of FIG. 4 with the placed printable substrate of FIG. 5.

FIG. 6 shows the stator base assembly with the base winding assembly 10 with inserted stator core 20 of FIG. 4 with the placed printable substrate 60 of FIG. 5. After placing of the printable substrate 60, the conductive structures 61 are connected to the open ends 14 of the conductor loops that are open on one side 12 of the base winding assembly 10 to form the windings of the stator.

Figure 7:
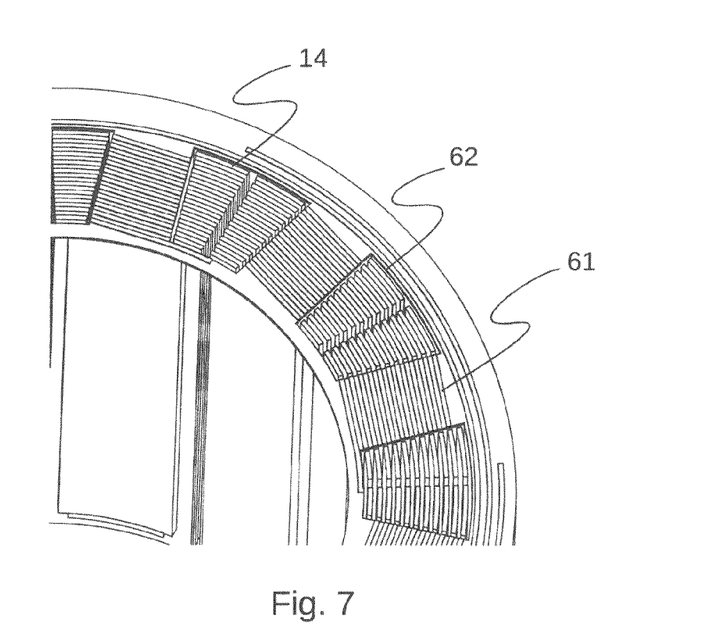
FIG. 7 a detailed view of the upper face side of the stator base assembly with the open ends of the conductor loops with the placed printable substrate.

FIG. 7 shows a detailed view of the upper face side of the stator base assembly with the placed printable substrate 60. It can be seen that the printable substrate 60 rests with its electrically insulating layer on the stator core 20 and the open ends 14 of the conductor loops that are open on one side 12 protrude through the recesses 62 in the printable substrate 60. The conductive structures 61 of the printable substrate 60 extend to the edges of the recesses 62 and can be connected to the open ends of the conductor loops that are open on one side 12 to connect the conductor loops that are open on one side 12. The connections can be made extremely efficiently and precisely using an additive manufacturing process.

The connecting leads of the winding head are formed by connecting the open ends 14 of the conductor loops that are open on one side 12 to the conductive structures 61 by means of a layer-by-layer additive manufacturing process. In this first, a first layer of build-up material for the connecting leads of the winding head is formed on the open ends 14 of the conductor loops that are open on one side 12 and the conductive structures 61, which forms a physical connection between the open ends 14 of the conductor loops that are open on one side 12 and the conductive structures 61 on the substrate. Thereafter, the connecting leads of the winding head are further built up layer-by-layer on this first layer using the additive manufacturing process.

The winding head thus formed has connection leads which extend substantially perpendicular to the plane of the printable substrate 60 and are preferably built up without crossing. By the further layer-by-layer construction of the connecting leads the conductivity of the connection leads is improved. Thus, large currents can be transmitted.

Figure 8:
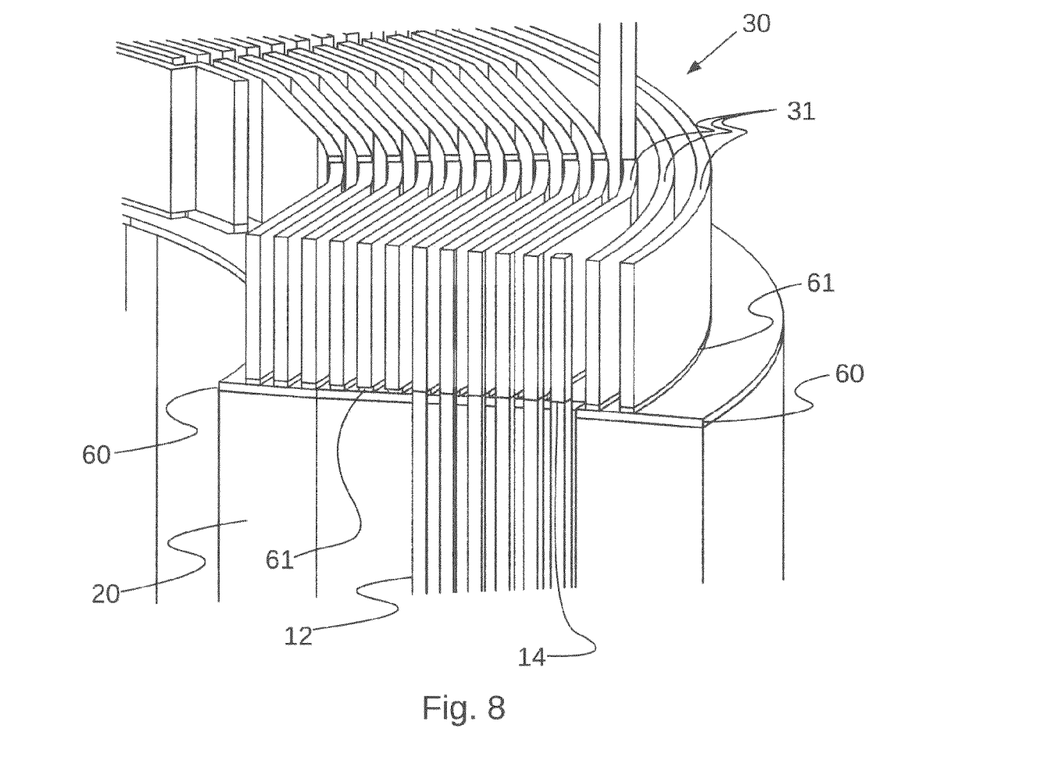
FIG. 8 a detailed view of the upper face side of the stator base assembly with the placed printable substrate and the winding head formed thereon.

FIG. 8 shows a perspective sectional view of a portion of the upper face side of the stator base assembly with placed printable substrate 60 and the winding head 30 formed thereon. The open ends of the conductor loops that are open on one side 12 can be seen, which protrude through a recess 62 of the printable substrate 60. The printable substrate 60 rests with its insulating surface on the stator core 20. The height of the printable substrate 60 and the conductive structures 61 formed thereon is selected such that the conductive structures 61 terminate at the same height as the open ends 14 of the conductor loops 12 that are open on one side.

On the open ends 14 of the conductor loops that are open on one side 12 and the conductive structures 61, the connecting leads 31 of the winding head 30 are formed by forming a first layer on the open ends 14 of the conductor loops that are open on one side 12 and the conductive structures 61 by means of an additive manufacturing process in the plane on which the conductive structures 61 and the open ends 14 of the conductor loops that are open on one side 12 terminate. On this first layer the connecting leads 31 of the winding head 30 are then further built up by means of the additive manufacturing process, as shown in FIG. 8. A possible gap between the open ends 14 of the conductor loops that are open on one side 12 and the printable substrate 60 is bridged by the additive manufacturing process.

Figure 9:
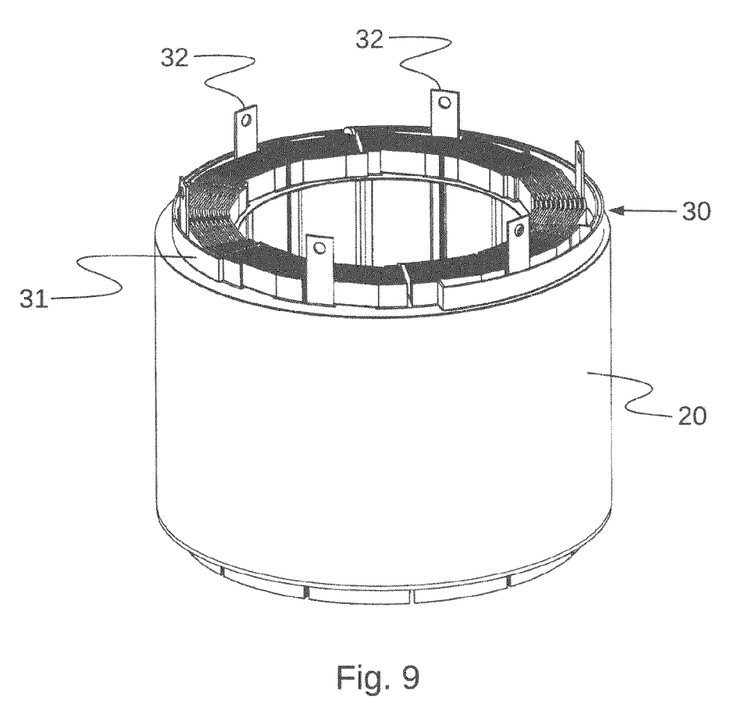
FIG. 9 a completed stator with a winding head that is formed on the open ends of the conductor loops that are open on one side of the base winding assembly.

FIG. 9 shows a completed stator with a winding head 30 formed on the open ends 14 of the conductor loops that are open on one side 12. The winding head 30 can be built up until the stator reaches a required height. As shown in FIG. 9, during the manufacture of the winding head 30, electrical connections 32 are also made through which current can be applied to the windings of the stator.

The method described with reference to FIG. 5 to FIG. 9 for forming a winding head using a printable substrate by means of an additive manufacturing process can also be used with a stator base assembly whose base winding assembly is conventionally manufactured, for example by manufacturing the conductor loops that which are open on one side by means of a stamping-bending process and plugging them onto the stator core. It is only essential for the applicability of the described method for forming the winding head that the face side of the stator base assembly with the open ends of the conductor loops is formed such that a printable substrate as described above can be placed on it, so that the open ends of the conductor loops and the conductive structures of the printable substrate are arranged such that the winding head can be built up on them.

On the upper side of the stator with the winding head 30, further components not shown can be formed during the final manufacturing steps. For example, power electronics components can be integrated into the stator in a simple manner by integrating them on the printable substrate. Likewise, the integration of cooling structures or more complex electrical connections such as plug connectors is conceivable.

The manufacturing process shown above allows a stator with a geometrically complex and compact winding structure to be manufactured which can be manufactured with high precision and reliability due to the additive manufacturing of the base winding assembly 10. The application of the windings to the pole cores 21 of the stator core 20 is possible in a simple manner and in a short time using the manufacturing method described above, since the stator core 20 only has to be inserted into the openings of the base winding assembly 10 formed by the open ends 14 of the conductor loops that are open on one side 12. In the described embodiment example, the manufacturing of the winding head 30 also is done via a additive manufacturing process. This enables a simple and cost-effective manufacturing of a winding head 30 with complex geometry and low installation space requirements.

The invention was described above on the basis of a stator for a rotating electrical machine. The manufacturing method according to the invention can be used in the manufacture of stators or rotors of all electrical machines such as a rotating electrical machine, as well as in the manufacture of stators or rotors of a linear motor in which the pole cores are arranged along a direction of movement of a rotor of the linear motor. In this case, the conductor loop groups of the base winding assembly are not manufactured along the circumferential surface of a cylinder, but in a linear configuration where they are arranged side by side on a straight line. In this case, the stator core is formed accordingly with pole cores arranged linearly next to each other and is plugged onto the linearly configured base winding assembly. Subsequently, the open ends of the conductor loop groups are closed by forming a winding head.

LIST OF REFERENCE SIGNS

10 base winding assembly
11 conductor loop assembly
12 conductor loop that is open (on one side)
13 closed end
14 open end
15 connecting structure
20 stator core
21 pole core
22 yoke
30 winding head
31 connecting lead
32 electrical connection
51 insulator plate
53 insulating medium
60 printable substrate
61 conductive structure
62 recesses

The invention claimed is:

1. A method of manufacturing a stator for an electrical machine, the method comprising:
   manufacturing a base winding assembly in one piece by an additive manufacturing process in which a layer-by-layer application and local solidification of build-up material takes place, the base winding assembly comprising conductor loop groups each formed of conductor loops having an open end and a closed end, wherein the closed ends of the conductor loops are arranged at a face side of the base winding assembly and the open ends are arranged at an opposite face side of the base winding assembly,
   wherein, during the one-piece-manufacturing of the base winding assembly, connecting structures are formed on the open ends of the conductor loops, the connecting structures rigidly connecting the conductor loops within a conductor loop group and/or connecting the conductor loop groups to one another, wherein the connecting structures are removed before forming a winding head on the open ends of the conductor loops;
   manufacturing a stator base assembly by assembling the base winding assembly and a stator core having a plurality of pole cores, wherein the assembling the base winding assembly and the stator core includes disposing at least one pole core in each of the conductor loop groups, and
   forming the winding head on the opposite face side of the stator base assembly with the open ends of the conductor loops, wherein, prior to forming the winding bead, placing a printable substrate on the opposite face side of the stator base assembly with the open ends of the conductor loops, wherein the printable structure includes conductive structures for connecting the conductor loops.

2. The method according to claim 1, wherein the connecting structures include spacers adapted to guide the stator core when assembling the stator core on to the base winding assembly.

3. The method according to claim 1, wherein the conductor loops comprise features for fixing an insulator plate and/or for guiding the stator core.

4. The method according to claim 1, wherein the manufacturing of the base winding assembly causes the conductor loops have a rough surface.

5. The method according to claim 1, wherein the base winding assembly is manufactured on a building plate such that the closed ends of the conductor loops are disposed on the building plate.

6. The method of claim 1, wherein the stator core with the pole cores is inserted into the open ends of conductor loops.

7. The method according to claim 1, wherein the stator core is formed in one piece and/or is produced by the additive manufacturing process.

8. The method according to claim 1, wherein the stator core is made of a soft magnetic material.

9. The method according to claim 1, further comprising removing the connecting structures before forming the winding head.

10. The method according to claim 1, wherein, before inserting the stator core, applying an electrically insulating layer for preventing an electrical contact between the conductor loop groups and the stator core, the electrically insulating layer being applied to the inside of the closed ends of the conductor loops.

11. The method according to claim 10, wherein the electrically insulating layer is formed by an insulator plate which is fitted on the open ends of the conductor loops, so that the inner sides of the closed ends of the conductor loops are covered by the insulator plate.

12. The method according to claim 10, wherein the electrically insulating layer is formed by a coating material applied to the inner sides of the closed ends of the conductor loops.

13. The method according to claim 1, further comprising inserting an insulating material between the stator core and the open conductor loops during the insertion of the stator core.

14. The method according to claim 1, further comprising filling gaps between the base winding assembly and the stator core with an insulating medium after insertion of the stator core.

15. The method according to claim 1, wherein the printable substrate is formed of a non-conductive substrate and wherein the conductive structures are formed of an electrically conductive material the printable substrate and the conductive structures connecting the open conductor loops to the open ends after the printable substrate has been arranged.

16. The method according to claim 1, wherein the forming of the winding head and/or forming of electrical connections for the conductor loop groups is performed by the additive manufacturing process.

17. A stator for an electric machine, made according to the method of claim 1.

* * * * *